United States Patent
Neale (10) Patent No.: US 6,719,368 B1
(45) Date of Patent: Apr. 13, 2004

(54) VEHICLE SEAT ASSEMBLY HAVING A CRADLE SEAT BACK

(75) Inventor: Colin G. Neale, Northville, MI (US)

(73) Assignee: Magna Seating Systems Inc., Aurora (CA)

(*) Notice: Subject to any disclaimer, the term of this patent is extended or adjusted under 35 U.S.C. 154(b) by 0 days.

(21) Appl. No.: 10/220,463
(22) PCT Filed: Feb. 28, 2001
(86) PCT No.: PCT/US01/06712
§ 371 (c)(1), (2), (4) Date: Jan. 21, 2003
(87) PCT Pub. No.: WO01/64475
PCT Pub. Date: Sep. 7, 2001

(51) Int. Cl.$^7$ .................................. G60N 2/68
(52) U.S. Cl. .............. 297/216.14; 297/216.12
(58) Field of Search ............. 297/216.1, 216.12, 297/216.13, 216.14

(56) References Cited

U.S. PATENT DOCUMENTS

| | | |
|---|---|---|
| 3,697,128 A | 10/1972 | Strien et al. |
| 3,761,127 A | 9/1973 | Giese et al. |
| 3,799,609 A | 3/1974 | Cunningham |
| 3,802,737 A | 4/1974 | Mertens |
| 4,162,807 A | 7/1979 | Yoshimura |
| 4,183,582 A | 1/1980 | Taki |
| 5,044,693 A | 9/1991 | Yokota |
| 5,137,329 A | 8/1992 | Neale |
| 5,246,271 A | 9/1993 | Boisset |
| 5,295,729 A | 3/1994 | Viano |
| 5,370,440 A | 12/1994 | Rogala |
| 5,378,043 A | 1/1995 | Viano et al. |
| 5,795,019 A | 8/1998 | Wieclawski |
| 5,795,024 A | 8/1998 | Collins et al. |
| 5,884,968 A | 3/1999 | Massara |
| 5,934,750 A | 8/1999 | Fohl |
| 6,024,406 A | 2/2000 | Charras et al. |
| 6,050,637 A | 4/2000 | Haland et al. |
| 6,062,642 A | 5/2000 | Sinnhuber et al. |
| 6,109,692 A | 8/2000 | Haland et al. |

FOREIGN PATENT DOCUMENTS

| | | |
|---|---|---|
| EP | 0 886 587 | 1/1997 |
| EP | 0923 461 | 9/1997 |

Primary Examiner—Peter R. Brown
(74) Attorney, Agent, or Firm—Clark Hill PLC (57) ABSTRACT

A seat assembly for supporting a seat occupant in an automotive vehicle comprising a seat cushion for support the seat occupant on the seat assembly (10) and a seat back (16) extending longitudinally between a lower portion operatively coupled to the seat cushion and an upper portion for supporting the seat occupant in an upright position. The seat back (16) includes an outer peripheral frame member and an inner occupant support frame operatively connected and supported by the outer peripheral frame member and movable from an occupant support position to an impact displacement position extending rearwardly of the outer peripheral frame member. A displaceable connection member operatively interconnects the inner occupant support frame in the occupant support position during normal seat occupant use and for providing movement of the inner occupant support frame to the impact displacement position in response to a predetermined impact load exerted on the seat assembly (10).

17 Claims, 12 Drawing Sheets

VEHICLE SEAT ASSEMBLY HAVING A CRADLE SEAT BACK

BACKGROUND OF THE INVENTION

1. Field of Invention

The present invention relates generally to a seat assembly for use in an automotive vehicle, and more particularly, to a seat assembly having an inner occupant support frame which is movable from an occupant support position to an impact displacement position in response to rear impact loads on the seat assembly.

2. Description of the Related Art

Automotive vehicles include seat assemblies for supporting driver and passenger occupants within the vehicle. These seat assemblies include a generally horizontal seat cushion and an upright seat back. The seat back is commonly operatively coupled to the seat cushion by a recliner mechanism for providing pivotal adjustment of the seat back relative to the seat cushion between an upright seating position and a plurality of reclined positions. The vehicle also includes a seat restraint system operable with the seat assembly for maintaining the seat occupant in the seat upon the incident of a sudden impact upon the vehicle.

It is becoming increasing desirable to provide additional safety features within the vehicle and on the seat assembly for safely restraining the occupant in the seat and absorbing energy within the vehicle upon impact.

For example, the seat assembly often includes a head restraint connected to the upper portion of the seat back for protecting the occupant's head during a vehicle accident. Head restraint may be vertically adjustable to accommodate various occupant heights and pivotally adjustable to position the head restraint close to the occupant head to assist in prevent "whiplash" upon vehicle impact. The U.S. Pat. No. 5,378,043 to Viano et al. discloses a head restraint which is pivotally coupled to the seat back whereby upon a rear vehicle impact the head restraint moves in a forward direction toward the head of the seat occupant.

Seat assemblies may also include displacable seat mechanisms for displacing the entire seat assembly, or the entire seat back, rearwardly upon rear vehicle impact to maintain the occupant in the seat and absorb energy via the movement of the seat. Examples of displacable and energy absorbing seat assemblies are disclosed in U.S. Pat. Nos. 6,050,637; 6,109,692 and 6,062,642.

It remains desirable, however, to improve the retention and energy dissipation in a seat assembly to protect an occupant during a vehicle rear impact.

SUMMARY OF THE INVENTION

The present invention relates to a seat assembly for supporting a seat occupant in an automotive vehicle comprising a seat cushion for support the seat occupant on the seat assembly and a seat back extending longitudinally between a lower portion operatively coupled to the seat cushion and an upper portion for supporting the seat occupant in an upright position. The seat back includes an outer peripheral frame member, an inner occupant support frame operatively connected and supported by the outer peripheral frame member and movable from an occupant support position to an impact displacement position extending rearwardly of the outer peripheral frame member, and a displacable connection member operatively connecting the inner occupant support frame and the outer peripheral frame for maintaining the inner occupant support frame in the occupant support position during normal seat occupant use and for providing movement of the inner occupant support frame to the impact displacement position in response to a predetermined impact load exerted on the seat assembly.

BRIEF DESCRIPTION OF THE DRAWINGS

Other advantages of the present invention will be readily appreciated as the same becomes better understood by reference to the following detailed description when considered connection with the accompanying drawings wherein.

DETAILED DESCRIPTION OF THE PREFERRED EMBODIMENTS

Figure 1:
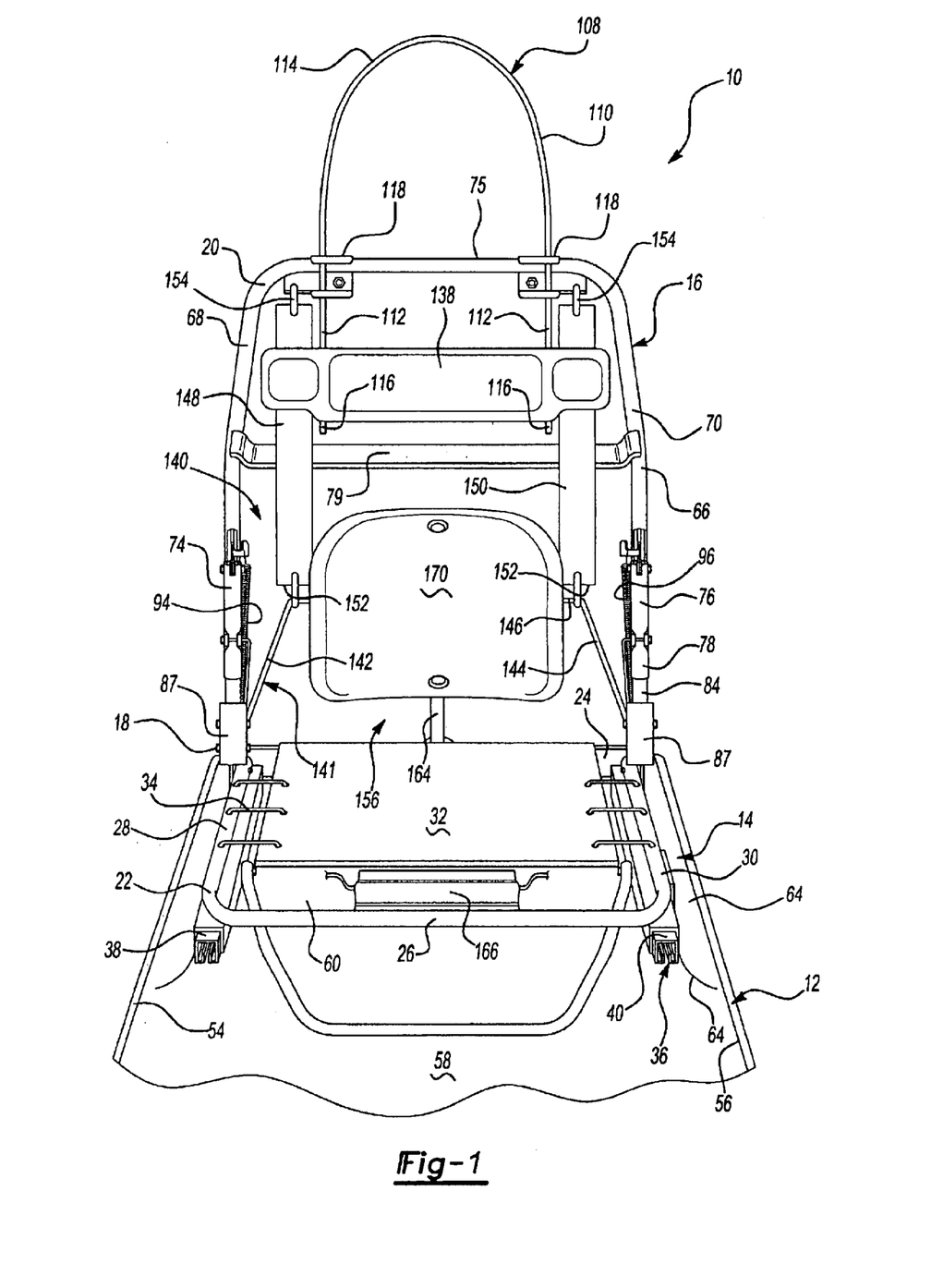
FIG. 1 is a front view of a seat assembly according to the present invention.
Figure 2:
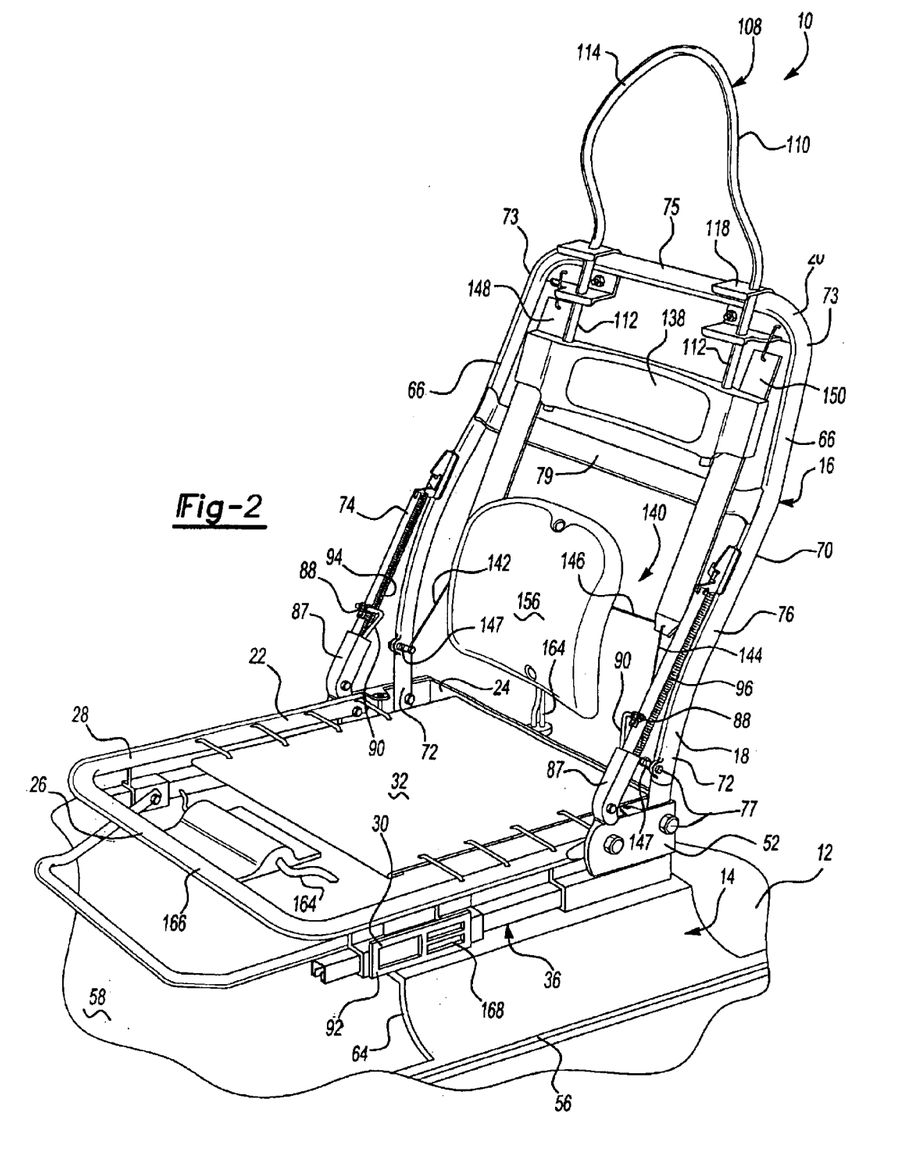
FIG. 2 is a perspective view of the seat assembly of FIG. 1.
Figure 3:
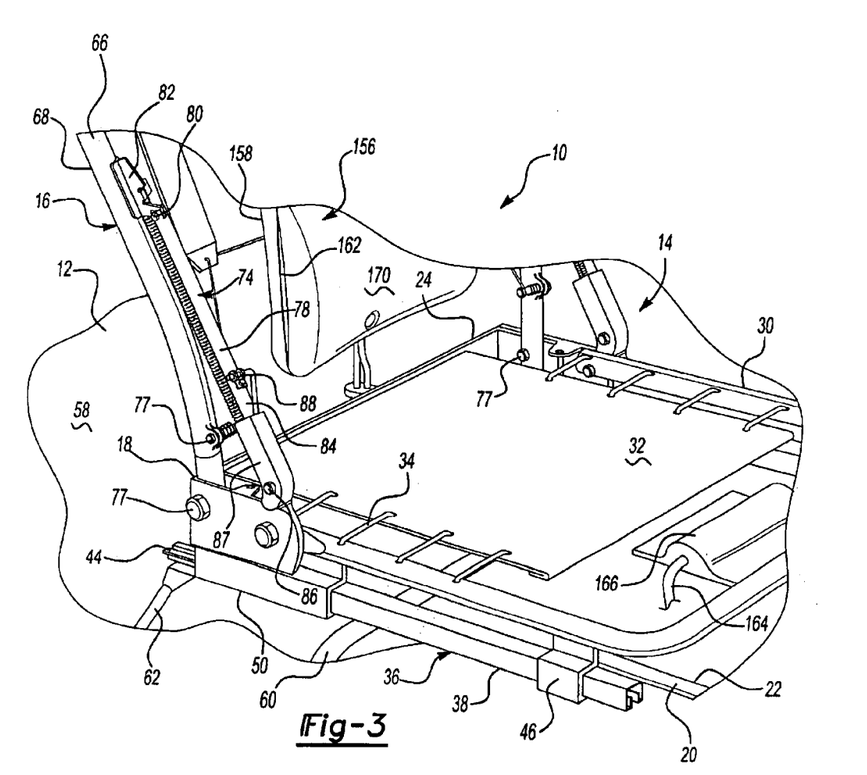
FIG. 3 is a perspective view of a linear recliner operatively coupled between a seat back and seat cushion of the seat assembly of FIG. 1.

Referring to FIGS. 1–3, a seat assembly is generally depicted at 10 for supporting a seat occupant in an automotive vehicle, simulated at 12. The seat assembly 10 includes a generally horizontal seat cushion 14 for supporting the seat occupant on the seat assembly 10 and a seat back 16 extending longitudinally between a lower portion 18 operatively coupled to the seat cushion 14 and an upper portion 20. The seat cushion 14 includes a tubular seat cushion frame 22 forming a rigid and generally rectangular support frame having a first cross bar member 24 adjacent to the lower portion 18 of the seat back 16 and an opposing second cross bar member 26 spaced forwardly of the first cross bar member 24. The seat cushion frame 22 further includes spaced apart and opposing inboard and outboard support bar members 28, 30 which extend between the first and second cross bar members 24, 26. A flexible membrane suspension mat 32 is supported between the inboard and outboard support bar members 28, 30 by a plurality of hooks or connecting links 34 for supporting the seat occupant on the seat assembly 10 as is commonly known in the art.

The seat cushion frame 22 is supported on a conventional seat track assembly 36 which extends longitudinally between the first cross bar member 24 and the second cross bar member 26 for providing fore and aft movement of the seat assembly 10 in the vehicle 12, as is commonly known in the art. The seat track assembly 36 includes an inboard and outboard upper track 38, 40 slidably coupled to respective inboard and outboard lower tracks 42, 44. A pair of front brackets 46, 48 fixedly secure the respective inboard and outboard support bar members 28, 30 of the seat cushion frame 22 to the respective upper tracks 38, 40 adjacent to the second cross bar member 26. Similarly, a pair of U-shaped rear brackets 50, 52 fixedly secure the respective inboard and outboard support bar members 28, 30 to the respective upper tracks 38, 40 adjacent the first cross bar member 24.

Referring to FIGS. 1 and 3, the seat track assembly 36, and thus, the entire seat assembly 10 is mounted to and between longitudinal structural elements typically referred to as the central tunnel 54 and outboard sill 56 and supported above the vehicle floor, illustrated at 58, by a pair of support bars 60, 62 which extend laterally between the opposing tunnel 54 and sill 56. More specifically, the lower tracks 42, 44 are mounted and secured to each of the support bars 60, 62 between the tunnel 54 and sill 56. The supporting of the seat assembly 10 above the vehicle floor 58 provides space below the seat cushion 14 for additional storage within the vehicle 12 and additional foot room for a vehicle occupant seated behind the seat assembly 10. The outboard, and potentially exposed, ends of the support bars 60, 62 may be covered and integrated with the sill of the vehicle by being trimmed by floor covering 64 to match the vehicle floor 58.

Referring to FIGS. 1–4, the seat back 16 includes a rigid, tubular, outer peripheral frame member 66 forming a generally U-shaped seat back frame. The outer peripheral frame member 66 includes a pair of spaced apart inboard and outboard side support bars 68, 70 extending longitudinally from a first distal end 72 adjacent the seat cushion 14 and a second end 73 to define a seat occupant back support envelope therebetween. An upper support bar 75 interconnects the second ends 73 of the side support bars 68, 70. The first distal ends 72 of each of the inboard and outboard side support bars 68, 70 are pivotally attached to the respective inboard and outboard rear brackets 50, 52 via pivot pins 77 to provide pivotal reclining movement of the seat back 16 with respect to the seat cushion 14. A rigid support brace 79 further interconnects the inboard and outboard side support bars 68, 70 midway between the first distal ends 72 and the second ends 73 to provide additional structural rigidity to the outer peripheral frame member 66.

Figures 7, 8, 9:
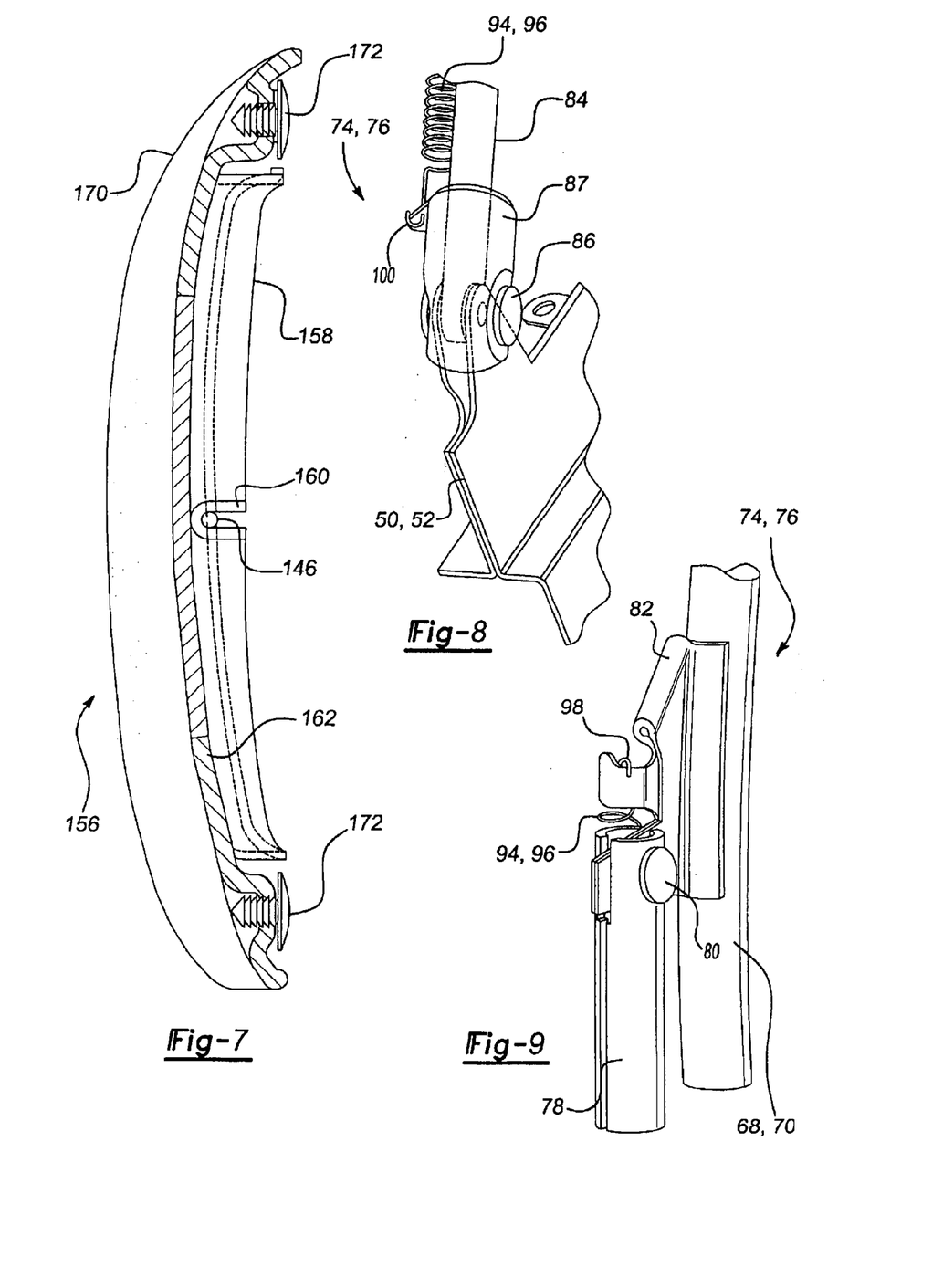
FIG. 7 is a side view of an adjustable lumbar support assembly operatively connected to the inner occupant support frame.
FIG. 8 is a perspective view of a lower portion of the linear recliner pivotally attached to the seat cushion.
FIG. 9 is a perspective view of an upper portion of the linear recliner pivotally attached to the seat back.

Referring to FIGS. 1–4 and 8–9, the seat assembly 10 further includes a pair of linear recliner mechanisms 74, 76 coupled between the seat cushion 14 and seat back 16 for selectively adjusting the seat back 16 between a range of angular reclined positions relative to the seat cushion 14. More specifically, each linear recliner mechanism 74, 76 includes an upper cylinder 78 having a first end pivotally attached by pivot pin 80 to a bracket 82 on each respective inboard and outboard side support bar 68, 70 of the outer peripheral frame 66, as shown in FIG. 9, and a second open end. The linear recliner mechanisms 74, 76 also include a lower piston 84 having a first end telescopingly received in the open end of the upper cylinder 78 and a second end pivotally attached by pivot pin 86 to the respective rear brackets 50, 52 on the seat cushion frame 22. The second end of the lower piston 84 is spaced forward of the pivot pin 72 connecting the outer peripheral frame 66 of the seat back 16 and the seat cushion frame 22 to complete a triangulated structural frame between the outer peripheral frame 66, the seat cushion frame 22 and the linear recliner mechanisms 74, 76. The second end of the lower pistons 84 and the pivot pins 86 are covered by a tubular trim fairing 87. Referring to FIG. 5, each linear recliner mechanism 74, 76 includes a spring bias locking mechanism 88 secured to the upper cylinder 78 and engagable with the lower piston 84 for locking and retaining the linear recliner mechanism 74, 76 within the range of reclined positions. A Bowden-type cable assembly 90 is interconnected between the locking mechanism 88 and a release latch 92 for releasing the locking mechanism 88 and allowing the pivotal movement of the seat back 16 to a desired reclined position. The seat back 16 is biased toward a generally upright position as shown in FIGS. 1–4 by a pair of tension springs 94, 96 extending between the seat back 16 and the seat cushion 14 adjacent to and inward of the respective linear recliner mechanism 74, 76. More specifically, referring to FIGS. 8 and 9, each tension spring 94, 96 has a first end 98 connected to the bracket 82 and a second end 100 connected to the respective rear bracket 50, 52. The springs 94, 96 are pulled in tension as the linear recliner mechanisms 74, 76 are released and the seat back 16 is pivoted to a reclined position by the seat occupant. Therefore, when the linear recliner mechanisms 74, 76 are released, the seat back 16 is automatically biased toward the generally upright position.

Figure 10:
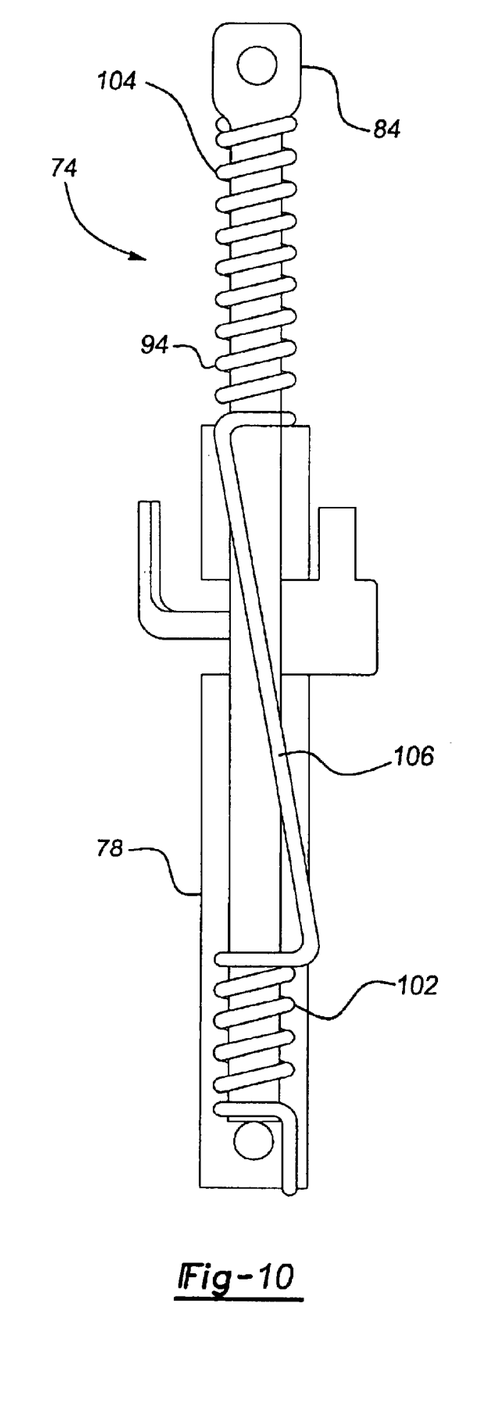
FIG. 10 is an alternative embodiment of a linear recliner for attachment between a seat cushion and a seat back.

Referring to FIG. 10, an alternative embodiment of a linear recliner mechanism 74 is shown including a tension spring 94 extending between the first end of the upper cylinder 78 and the second end of the lower piston 84. The tension spring 94 includes a first coil portion 102 spiraled around the second end of the lower piston 84 and a second coil portion 104 spiraled around the first end of the lower piston 84. The first and second coil portions 102, 104 are joined by a straight torsion bar section 106 seated between the upper cylinder 78 and the lower piston 84.

Figure 11:
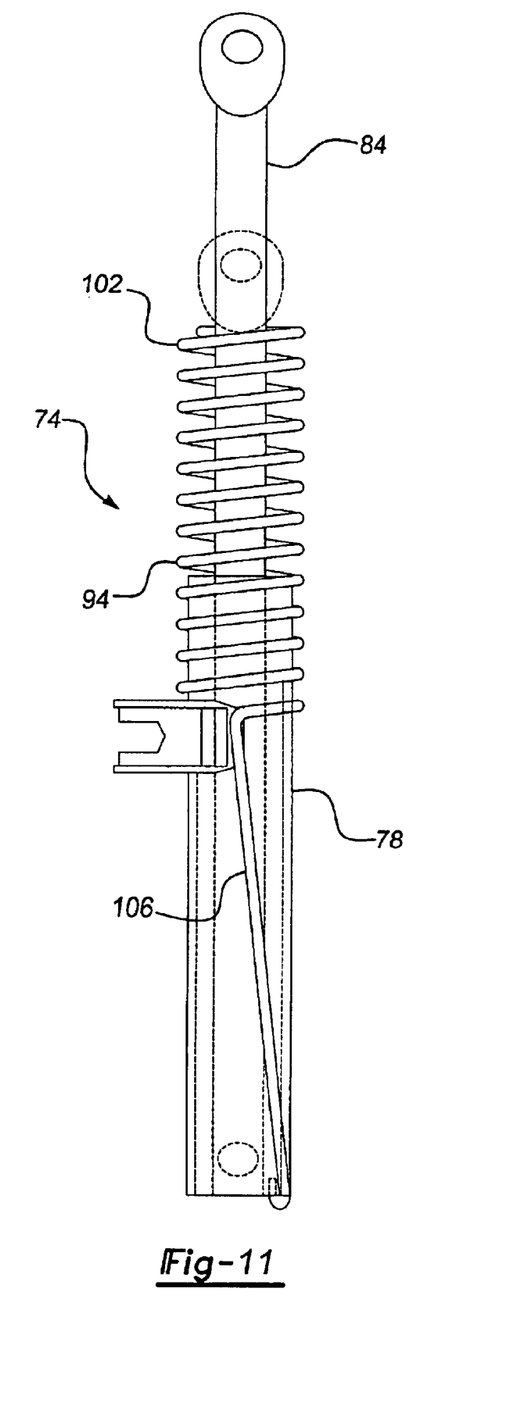
FIG. 11 is yet another alternative embodiment of a linear recliner for attachment between a seat cushion and a seat back.

Referring to FIG. 11, another alternative embodiment of a linear recliner mechanism 74 is shown including a tension spring 94 extending between the first end of the upper cylinder 78 and the second end of the lower piston 84. The tension spring 94 includes a coil portion 102 spiraled around a portion of the lower piston 84 adjacent the second end and a straight torsion bar section 106 extending from the first end of the upper cylinder 78 and the coil portion 102 and seated between the upper cylinder 78 and the lower piston 84.

Referring again to FIGS. 1, 2, 5 and 6, the seat assembly 10 further includes a head restraint 108 operatively connected to the seat back 16. The head restraint 108 includes a generally U-shaped frame member 110 having a tubular, rod or wire construction and defined by a pair of spaced apart head restraint posts 112 and an upper arc portion 114. The upper arc portion 114 maybe trimmed by a foam pad and trim cover, as commonly known in the art, and including a center head restraint panel of a transparent material to provide rear view visibility to a front seat occupant. The posts 112 extend from the arc portion 114 above the upper support bar 75 to a distal end 116 spaced below the upper support bar 75. Each of the posts 112 are pivotally attached to the upper support bar 75 by a pivot bracket 118. Referring specifically to FIGS. 5 and 6, the pivot bracket 118 includes a first plate 120 having a semi-cylindrical base portion 122 in mating engagement with the upper support bar 75 and a second plate 124 having a semi-cylindrical base portion 126 in mating engagement with the upper support bar 75, opposite the semi-cylindrical base portion 122, and encapsulating a portion of the upper support bar 75 therebetween. The second plate 124 is fastened to the first plate 120 by a bolt 128 to provide frictional resistance between the plates 120, 124 and the upper support bar 75 while allowing rotation of the plates 120, 124 around the upper support bar 75. The first plate 120 further includes a pair of spaced apart parallel upper and lower flanges 130, 132 extending outwardly from the semi-cylindrical base portion 122. Each of the flanges 130, 132 includes a through hole 134, 136 for receiving one of the head restraint posts 112 and fixedly securing the head restraint frame member 110 to the pivot brackets 118, and thus, the upper support bar 75. The pivot brackets 118 provide frictional resistance and pivotal movement of the head restraint frame member 110 about the upper support bar 75 to support the seat occupant's head, as will be described in more detail herein below.

The distal ends 116 of the head restraint posts 112 are interconnected by an upper seat back support plate 138 which extends laterally between the inboard and outboard side supports bars 68, 70 below the upper support bar 75. The upper seat back support plate 138 pivots the head restraint 108 forwardly toward the seat cushion 14 and about the upper support bar 75 in response to a force F being applied to the seat back 16 and upper seat back support plate as shown in FIG. 6. The forward pivoting of the head restraint 108 positions the head restraint immediately adjacent the seat occupants head to absorb energy in a rear impact vehicle collision as will be discussed in greater detail below.

Figure 4:
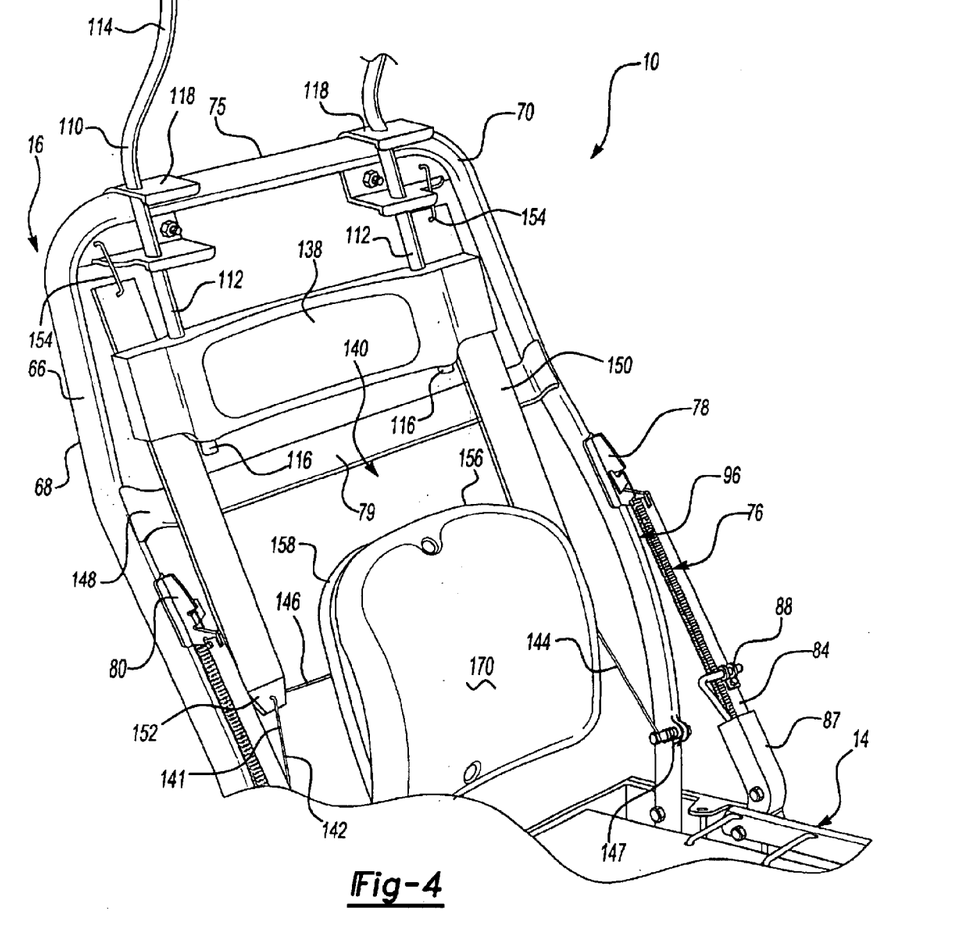
FIG. 4 is a perspective view of an inner occupant support frame of the seat assembly of FIG. 1.
Figures 5, 6:
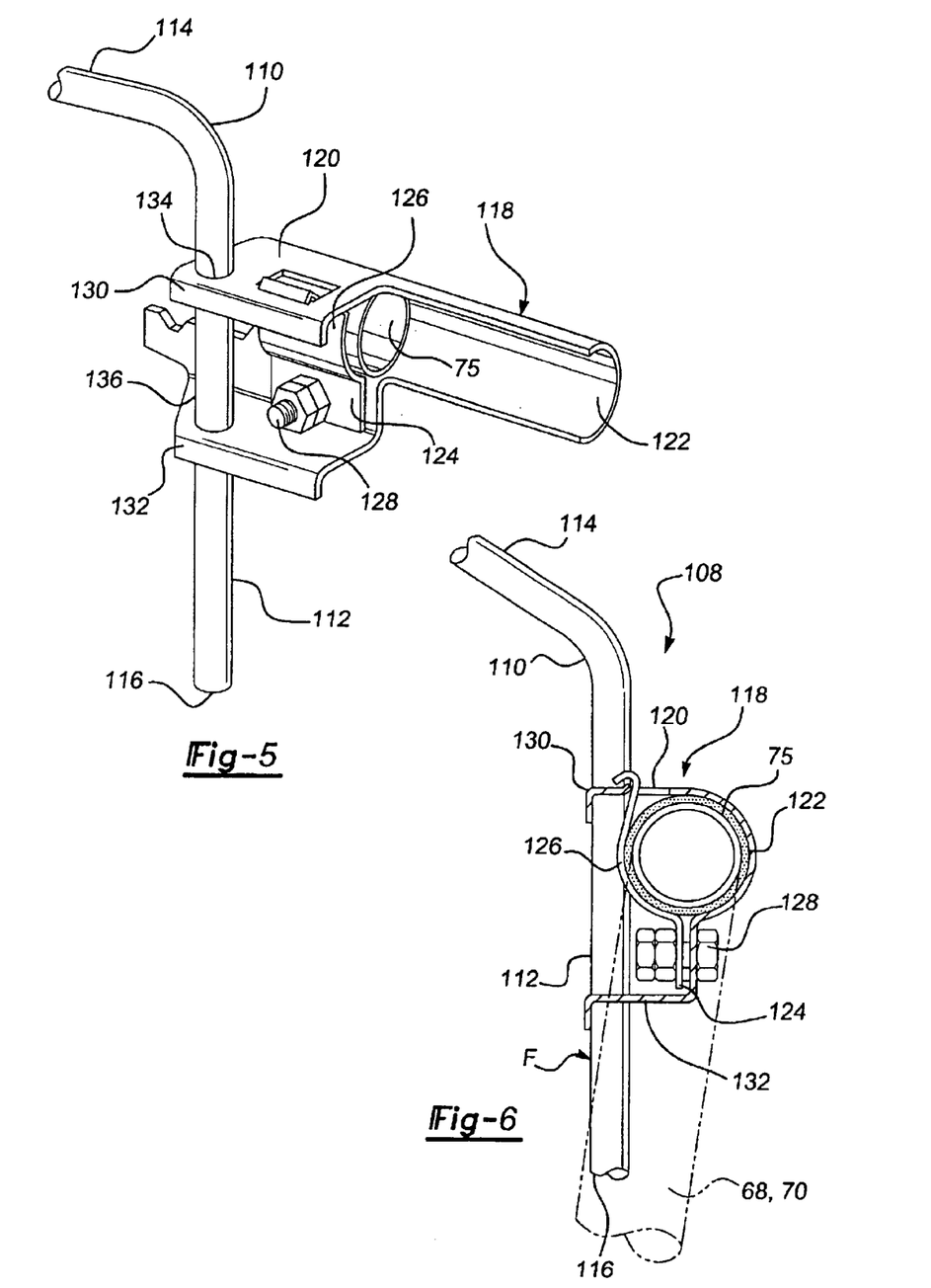
FIG. 5 is a perspective view of a pivot bracket for pivotally attaching a head restraint to the seat back of the seat assembly.
FIG. 6 is a cross-sectional side view of the pivot bracket pivotally attaching the head restraint to the seat back.

Referring to FIGS. 1, 2, and 4, the seat assembly 10 further includes an inner occupant support frame 140 operatively connected and supported by the outer peripheral frame 66 and movable from an occupant support position to an impact displacement position extending rearwardly of the outer peripheral frame 66. The inner occupant support frame 140 is mounted on a lateral torsion spring element 141 forming spring coils 147 connected to the first distal ends 72 of the respective inboard and outboard side support bar 68, 70 of the outer peripheral frame 66. The torsion spring element 141 includes a pair of spaced apart torsion bars 142, 144 extend upwardly from the first distal end 72 to a torso support bar 146 adjacent the respective inboard and outboard side support bars 68, 70. The torso support bar 146 extends laterally between the opposing inboard and outboard side support bars 68,70 and is positioned between the support brace 79 and the seat cushion 14 and slightly rearward of the outer peripheral frame 66. In the embodiment of FIGS. 1–4, the inner occupant support frame 140 further includes a pair of elastic straps 148, 150 extending parallel to the inboard and outboard side support bars 68, 70 between the torso support bar 146 and the upper support bar 75. More specifically, the elastic straps 148, 150 include a first end 152 connected to the torso support bar 146 adjacent the respective torsion bar 142, 144 and a second end 154 connected to the respective pivot bracket 118 of the head restraint 108. Additionally, the upper seat back support plate 138 is positioned forward of the elastic straps 148, 150 and may be operatively connected thereto by the straps 148, 150 passing through a slot in each opposing ends of the support plate 138.

Referring to FIGS. 1, 4 and 7, the inner occupant support frame 140 further includes a four-way adjustable lumbar support assembly 156. The lumbar support assembly 156 includes a generally rectangular and planar support plate 158 having a longitudinally extending U-shaped channel 160 for receiving the torso support bar 146 therein and securing the support plate 158 to the torso support bar 146. A plurality of air bladders 162 are connected to the support plate 158 and in fluid communication via air lines 164 with a pneumatic actuator 166. The pneumatic actuator 166 is secured to the second, or front, cross bar member 26 of the seat cushion frame 22 and operatively connected to an electro-pneumatic controller 168 secured to the outboard support bar member 30. A contoured lumbar back plate 170 is secured to the air bladders 162 via a pair of rivets 172 to provide angular displacement relative to the fixed support plate 158. The controller 168 actuates the pneumatic actuator 166 to pump fluid, in the preferred embodiment air, through the air lines 164 to the plurality of air bladders 162 and adjust the displacement of the lumbar back plate 170 for occupant comfort. Further disclosure and operation of the lumbar support assembly 156 is fully set forth and described in U.S. Pat. No. 5,137,329, which is incorporated herein by reference.

Figure 12:
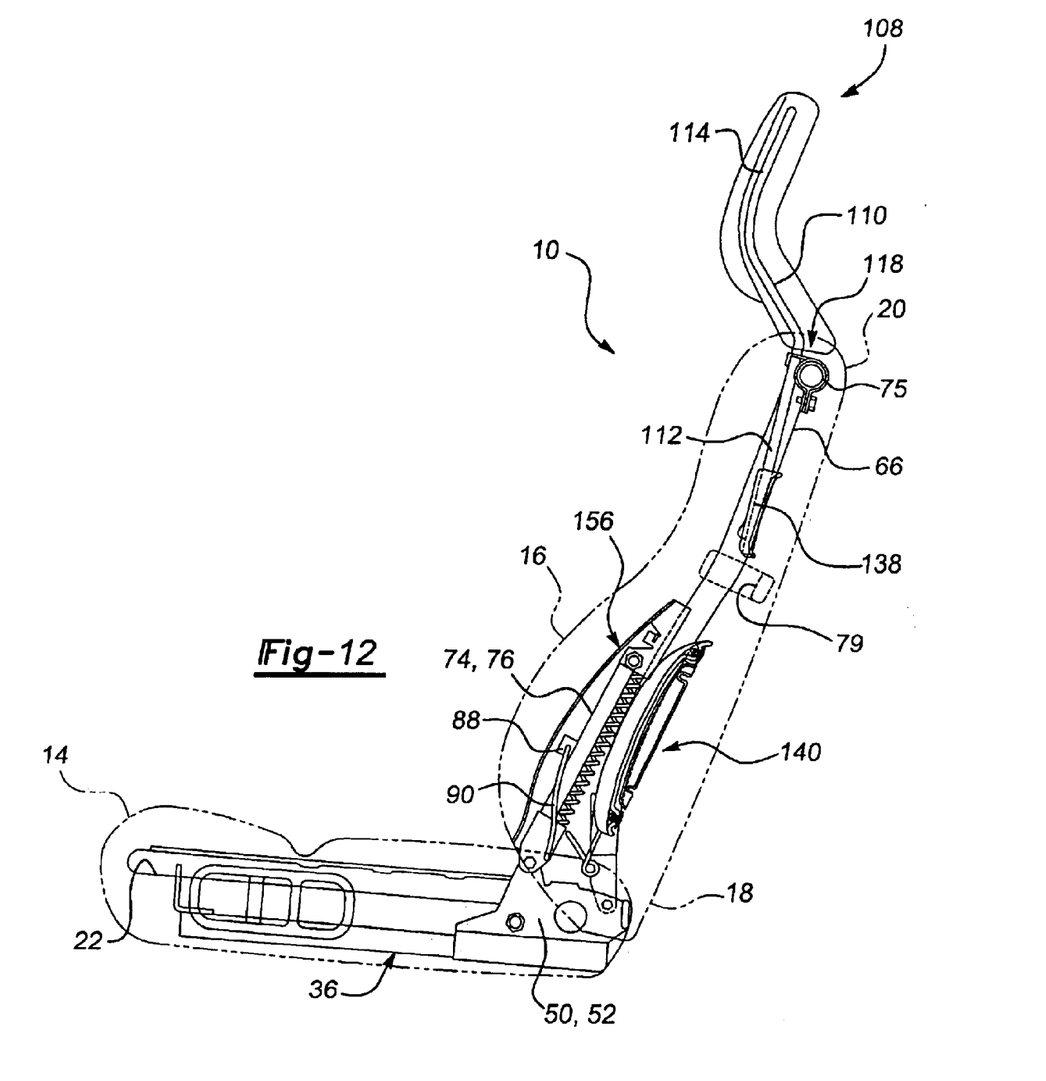
FIG. 12 is a side view of the seat assembly.
Figure 13:
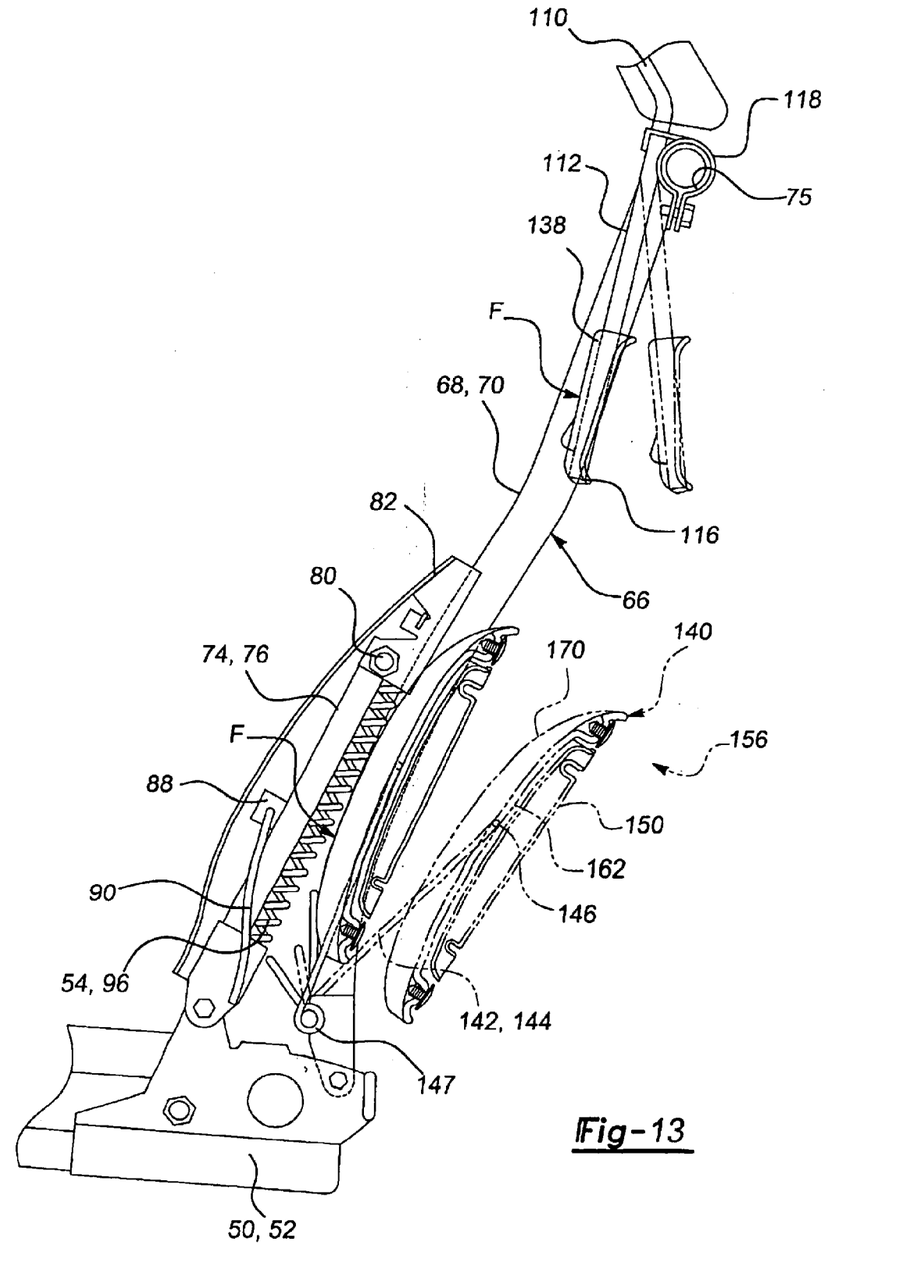
FIG. 13 is a side view of the seat assembly showing the inner occupant support frame in an occupant support position and an impact displacement position.

In operation, the inner occupant support frame 140 is displacable relative to the outer peripheral frame 66 from the occupant support position during normal seat occupant use to an impact displacement position in response to a predetermined impact load exerted on the seat assembly 10. More specifically, referring to FIG. 12, the seat assembly and inner occupant support frame 140 are shown in the occupant support position. The seat occupant is supported on the seat cushion 14 and the seat back 16. The seat occupant's body, or torso, is supported by the lumbar support assembly 156 and the upper seat back support plate 138 in the occupant support position with the head restraint 108 in a generally upright position as shown in FIG. 12. Referring to FIG. 13, when a predetermined rear impact force F is exerted on the seat assembly 10, the seat occupant is forced against the seat back 16. The seat occupant exerts a force against the upper seat back support plate 138 which is connected to the frame member 110 of the head restraint 108. Thus, the impact force on the upper seat back support plate 138 pivots, or rotates, the frame member 110 about the pivot brackets 118 forwardly toward the seat cushion 14 to close the distance between the head restraint 108 and the seat occupant's head to protect the seat occupant and absorb impact forces. Further, the seat occupant also exerts a force against the lumbar support assembly 156 which is supported by the inner occupant support frame 140. The elastic straps 148, 150 allow the inner occupant support frame 140 to move, or displace, rearwardly away from the outer peripheral frame 66, as shown in FIG. 13, to absorb the rear impact forces exerted on the seat 10. The torsion bars 142, 144 and the torso support bar 146 pivot against the spring bias force of the spring coils 147 and elastic straps 148, 150. Additionally, the seat occupant is displaced within the perimeter of the seat back outer peripheral frame 66 which provides a roll-bar type protective structure around the torso of the seat occupant. Therefore, the seat back 16, including the rigid outer peripheral frame 66 and the displacable inner occupant support frame 140 define a cradle about the seat occupant's torso absorbing the rear impact forces exerted on the seat 10. The spring coils 147 automatically return the inner occupant support frame 140 from the impact displacement position to the seat occupant position and the elastic straps 148, 150, which are coupled to the upper seat back support plate 138, return the head restraint 108 to the generally upright position.

Figure 14:
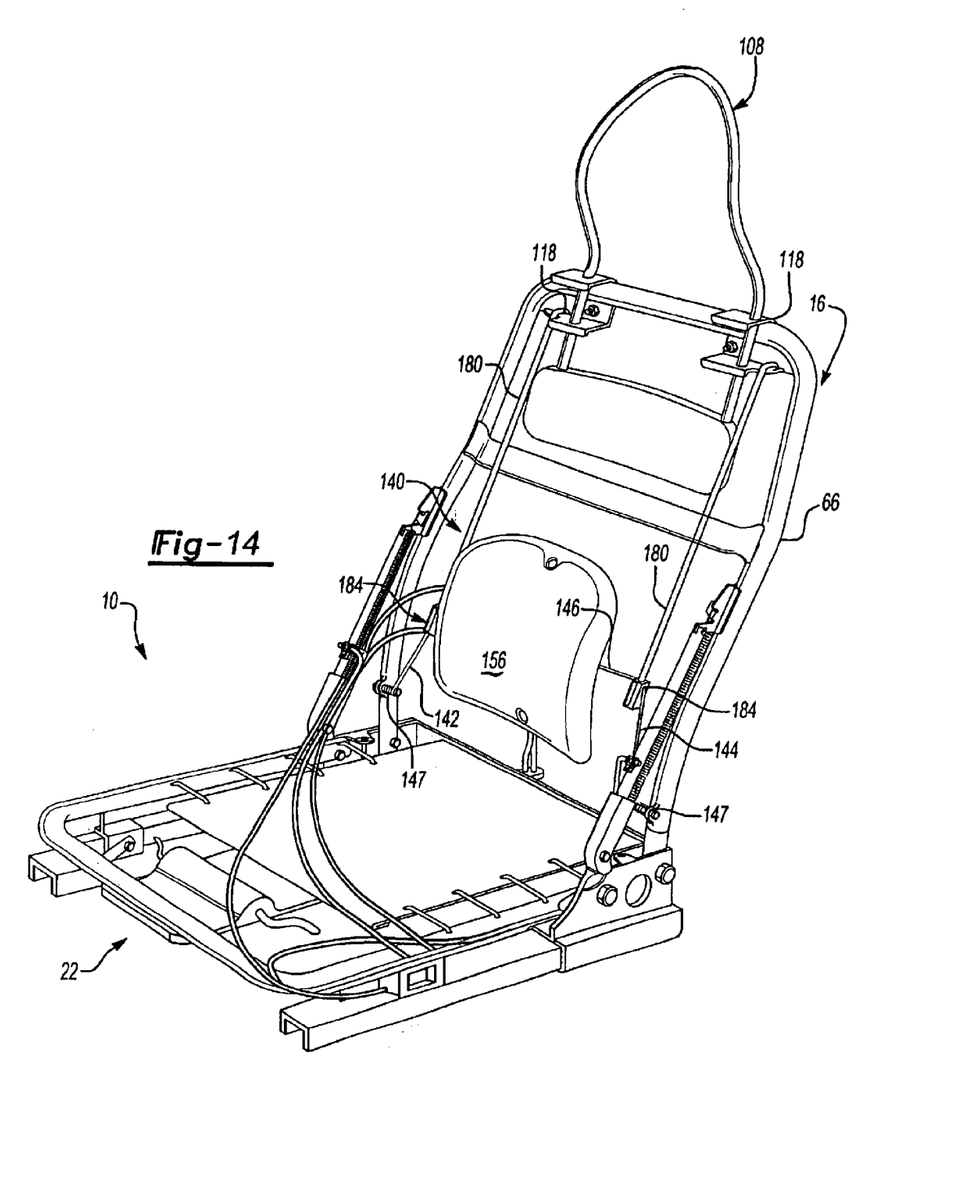
FIG. 14 is a perspective view of an alternative embodiment of a seat assembly and an inner occupant support frame.
Figures 15, 16:
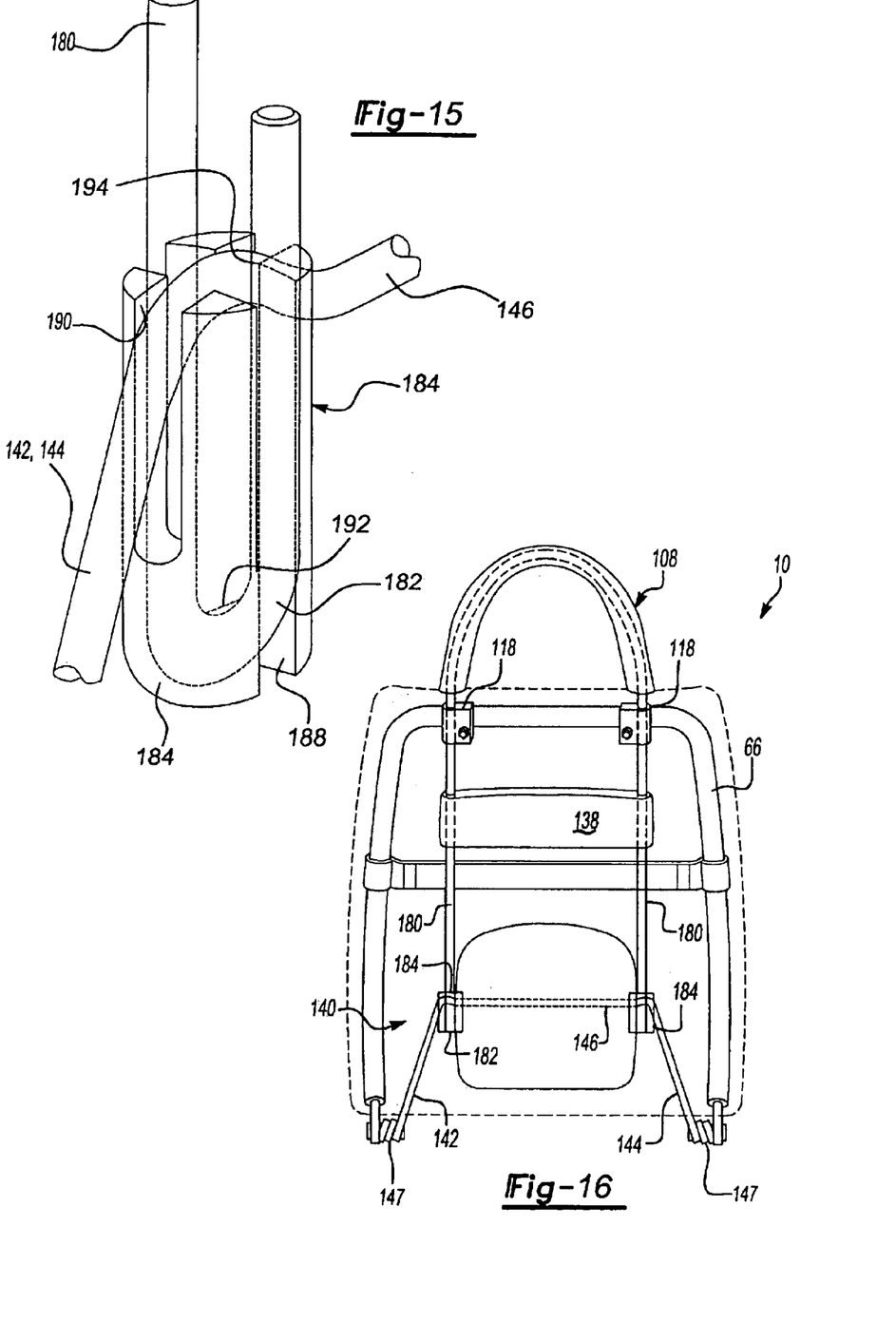
FIG. 15 is a perspective view of a displacable connection member of the seat assembly of FIG. 14 for providing movement of the inner occupant support frame from an occupant support position to an impact displacement position.
FIG. 16 is a front view of another alternative embodiment of a seat assembly and an inner occupant support frame.

Referring to FIGS. 14 and 15, an alternative embodiment of a seat assembly 10, and more particularly, an inner occupant support frame 140 is shown. The seat assembly 10 includes a seat back 16 having an outer peripheral frame 66 pivotally connected to a seat cushion frame 22. A head restraint assembly 108 is pivotally attached to the outer peripheral frame 66 as in the prior embodiment. The seat assembly 10 also includes an inner occupant support frame 140 operatively connected to the outer peripheral frame 66. The inner occupant support frame 140 similarly includes a torsion spring element 141 including a pair of torsion bars 142, 144 connected to the outer peripheral frame 66 by spring coils 147 and laterally interconnected by a torso support bar 146. The torso support bar 146 supports a four-way pneumatic lumbar support assembly 156 as previously described. The inner occupant support frame 140 further includes a pair of longitudinally extending wire rods 180, as opposed to the elastic straps 148, 150, extending between the respective pivot brackets 118 and the torso support bar 146 adjacent the respective torsion bar 142, 144. The wire rods 180 include a first end connected to the pivot brackets 118 and a second end forming a U-shaped hook 182 operatively connected to the torso support bar 146. The wire rods 180, and specifically the hooks 182, are connected to the torso support bar 146 by a displacable connection member 184. The interconnection between the wire rods 180 and the torso support bar 146 by the displacable connection member 184 is best shown in FIG. 15. The displacable connection member 184 includes a cylindrical body portion 186 having a first channel 188 extending longitudinally between opposing ends of the body portion 186 and a second channel 190 crossing transverse to the first channel 188 and extending longitudinally between opposing ends of the body portion 186. The channels 188, 190 each include a shelf 192, 194, respectively, for closing a portion of the channel 188, 190 which is fracturable in response to a predetermined load force. The displacable connection member 184 is positioned, or seated, between the hook 182 of each wire rod 180 and the torso support bar 146. More specifically, the hook 182 is seated within the first channel 188 and supported by the shelf 192 and the torso support bar 146 is seated within the second channel 190 and supported by the shelf 194. As shown in FIG. 15, the displacable connection member 184 maintains a space between the torso support bar 146 and the hook 182 approximately equivalent to the longitudinal length of the member 184.

In operation, when a predetermined rear impact load is exerted on the seat assembly 10, a seat occupant force is exerted on the inner occupant support frame 140. The shelves 192, 194 fracture in response to a predetermined load allowing the respective hooks 182 and torso support bar 146 to slide, or travel along their respective channels 188, 190 until the hooks 182 engage with the torso support bar 146. The spring coils 147 allow the torsion bars 142, 144' and torso support bar 146 to pivot rearwardly behind the outer peripheral frame 66 while the wire rods 180 pivot with respect to the pivot brackets 118 forming a cradle between the outer peripheral frame 66 to secure and support the seat occupant. The head restraint 108 operates independent of the inner occupant support frame 140, however, also still rotates against the frictional force of the pivot brackets 118 to support the seat occupant's head.

FIG. 16 shows yet another alternative embodiment of a seat assembly 10 and inner occupant support frame 140. The inner occupant support frame 140 of the alternative embodiment of FIG. 16 includes the wire rods 180 having the first end pivotally connected to the upper seat back support plate 138 of the head restraint 108 and a second end forming a U-shaped hook 182 operatively connected to the torso support bar 146 by displacable connection members 184. In this embodiment, the displacement of the inner occupant support frame 140 also automatically rotates, or articulates, the head restraint 108 about the pivot brackets 118 to support the seat occupant's head. Therefore, the head restraint 108 and the inner occupant support frame 140 simultaneously displace from the normal seating position and generally upright position to the impact displacement position in response to the predetermined rear impact load on the seat assembly 10.

Figure 17:
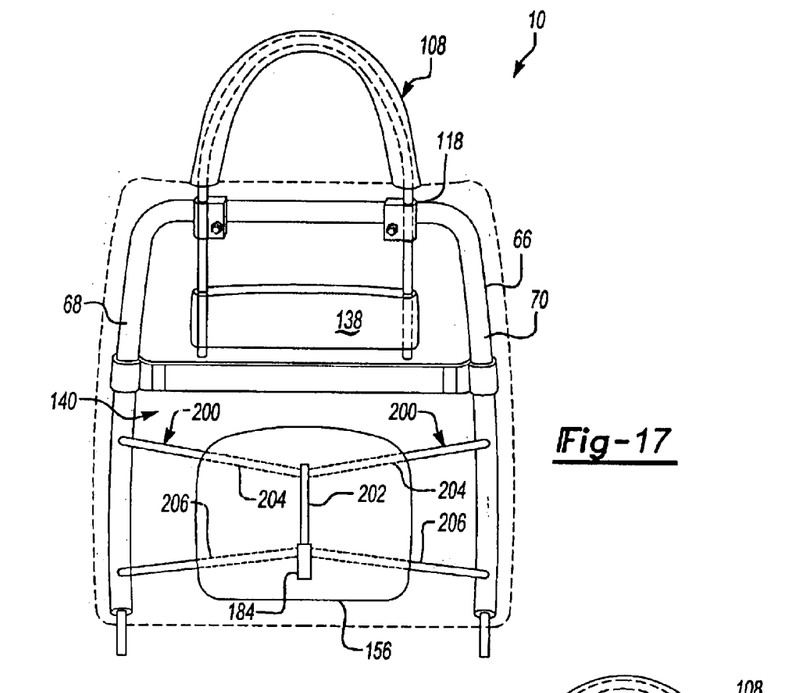
FIG. 17 is a front view of yet another alternative embodiment of a seat assembly and an inner occupant support frame.

FIG. 17 discloses still another alternative embodiment of a seat assembly 10 and inner occupant support frame 140. The inner occupant support frame 140 includes a pair of generally U-shaped side support rods 200 extending laterally between each of the respective inboard and outboard side support bars 68, 70 of the outer peripheral frame 66 and the lumbar support assembly 156. The support rods 200 include a pair of spaced apart lateral rods 204, 206 extending from the respective inboard and outboard side support bars 68, 70 and interconnected by a vertical bar member 202 connected to the center portion of the lumbar support assembly 156. The side support rods 200 pivot about the inboard and outboard side support bars 68, 70 in response to the predetermined rear impact force on the seat assembly 10 and inner occupant support frame 140 to cradle the seat occupant between the outer peripheral frame 66. A break away displacable connection member 184 interconnects the vertical bar member 202 and the lower lateral rods 206 of the support rods 200 such that when an impact load is exerted upon the seat 10 beyond a designated load, the connection member 184 releases the vertical bar 202 and allows the lower lateral rods 206 to straighten, thereby providing rearward displacement of the inner occupant support frame 140.

Figure 18:
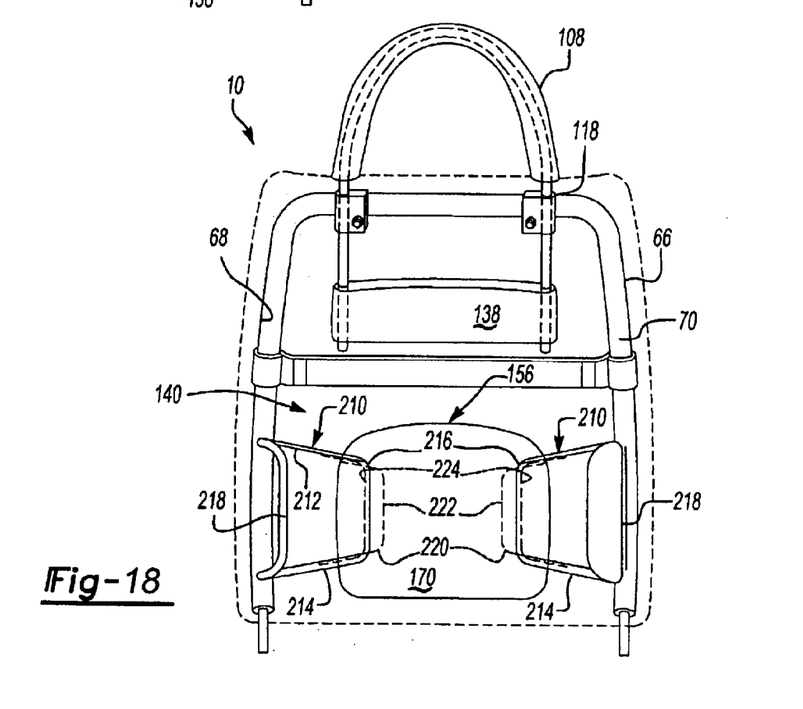
FIG. 18 is a front view of still another alternative embodiment of a seat assembly and an inner occupant support frame.

Finally, FIG. 18 discloses yet another alternative embodiment of a seat assembly 10 and inner occupant support frame 140. The inner occupant support frame 140 again includes a pair of generally rectangular side support rods 210 extending laterally between each of the respective inboard and outboard side support bars 68, 70 of the outer peripheral frame 66 and the lumbar support assembly 156. The side support rods 210 include a pair of spaced apart rods 212, 214 interconnected at a first end by a cross bar member 216 and interconnected at an opposite second end by a bolster support rod 218. The cross bar members 216 are operatively connected to the adjacent sides of the lumbar support assembly 156 and the second ends of the lateral rods 212, 214 are pivotally connected to the respective inboard and outboard side support bars 68, 70. The bolster support rods 218 project outwardly toward the front of the seat 10, i.e., toward the seat cushion, to form a bolster support frame. The rearward face of the lumbar support panel 170 includes a pair of vertical slots 220 for receiving the cross bar members 216 therein. Each slot 220 includes a first shelf 222 for securing and supporting the cross bar members 216 with the seat in the normal occupant seating position. Each slot 220 further includes a second shelf 224 spaced from the first shelf 222 for securing and supporting the cross bar members 216 in the impact displacement position. Again, when a predetermined rear impact force is exerted on the seat assembly 10 and inner occupant support frame 140, the lumbar support assembly 156 is forced rearwardly, behind the outer peripheral frame 66. The side support rods 210 pivot about the respective inboard and outboard side support bars 68, 70 to cradle the seat occupant between the outer peripheral frame 66. The slots 220 allow the cross bar members 216 to displace from the first shelf 222 to the second shelf 224 permitting rearward movement of the lumbar 156 and inner occupant support frame 140. Additionally the side support rods 210 also pivot and retract the bolster support rods 218 inwardly toward the center of the seat back 16 to support and retain the sides of the seat occupant against the inner occupant support frame 140 and between the outer peripheral frame 66. It should be appreciated that many variations of the inner occupant support frame and pivotal connections to the outer peripheral frame may be employed without varying from the scope of the invention.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

We claim:

1. A seat assembly for supporting a seat occupant in an automotive vehicle comprising:

a seat cushion for supporting the seat occupant on said seat assembly;

a seat back extending longitudinally between a lower portion operatively coupled to said seat cushion and an upper portion for supporting the seat occupant in an upright position;

said seat back including an outer peripheral frame member, an inner occupant support frame operatively connected and supported by said outer peripheral frame member and movable from an occupant support position to an impact displacement position extending rearwardly of said outer peripheral frame member, said outer peripheral frame member includes an inboard side support bar spaced from an outboard side support bar and interconnected at one end by a upper support bar to define a generally U-shaped outer peripheral frame member, said inner occupant support frame includes a pair of generally parallel spaced apart resilient straps positioned between said inboard and outboard side support bars and extending between a first end adjacent said seat cushion and a second end operatively coupled to said upper support bar of said outer peripheral frame, and a displacable connection member operatively connecting said inner occupant support frame and said outer peripheral frame for maintaining said inner occupant support frame in said occupant support position during normal seat occupant use and for providing movement of said inner occupant support frame to said impact displacement position in response to a predetermined impact load exerted on said seat assembly, said displacable connection member includes a lateral torsion spring element having a torsion support bar having opposite ends and extending laterally between said opposing spaced apart side support bars and a torsion bar extending from each end of said torsion support bar to said respective adjacent side support bar and a spring coil interconnecting each of said torsion bars to said respective side support bar for providing resilient displacement of said inner occupant support frame between said occupant support position and said impact displacement position.

2. A seat assembly as set forth in claim 1 wherein said first ends of said resilient straps are coupled to said lateral torsion support bar.

3. A seat assembly as set forth in claim 2 wherein said inner occupant support frame includes a lumbar support assembly having a planar support plate pivotally connected to said lateral torsion support bar between said spaced apart resilient straps.

4. A seat assembly as set forth in claim 3 wherein said lumbar support assembly includes a contoured lumbar back plate operatively coupled to said planar support plate facing said seat cushion.

5. A seat assembly as set forth in claim 4 wherein said lumbar support assembly includes at least one inflatable bladder coupled between said planar support plate and said contoured lumbar back plate for selective articulating said lumbar back plate relative to said planar support plate.

6. A seat assembly as set forth in claim 5 further including a head restraint assembly operatively coupled to each of said outer peripheral frame and said inner occupant support frame for supporting the seat occupant's head in each of said occupant support position and said impact displacement position.

7. A seat assembly as set forth in claim 6 wherein said head restraint assembly includes a pair of upright head restraint posts each pivotally coupled to said upper support bar of said outer peripheral frame by a pivot bracket.

8. A seat assembly as set forth in claim 7 wherein said head restraint posts extend from distal ends spaced below said upper support bar and between said side support bars to an upper arc portion to define a generally U-shaped frame member.

9. A seat assembly as set forth in claim 8 wherein said head restraint assembly includes an upper seat back support plate fixedly secured to said distal ends of said head restraint posts and extending laterally between said side support bars for pivoting said head restraint assembly about said upper support bar in response to said inner occupant support frame displacing between said occupant support position and said impact displacement position.

10. A seat assembly as set forth in claim 9 further including a linear recliner mechanism coupled between said seat cushion and said seat back from selectively adjusting said seat back between a range of angular reclined positions relative to said seat cushion.

11. A seat assembly as set forth in claim 10 wherein said linear recliner mechanism includes a upper cylinder having a first end pivotally attached to one of said inboard and outboard side support bar of said outer peripheral frame and a second open end, a lower piston having a first end telescopingly received in said second open end of said upper cylinder and a second end pivotally attached to said seat cushion, and a locking mechanism engagable between said upper cylinder and said lower piston for locking and retaining said linear recliner mechanism within said range of reclined positions.

12. A seat assembly as set forth in claim 11 further including at least one tension spring extending between said seat back and said seat cushion adjacent said linear recliner mechanism for biasing said seat back toward said upright position.

13. A seat assembly for supporting a seat occupant in an automotive vehicle comprising:
- a seat cushion for supporting the seat occupant on said seat assembly;
- a seat back extending longitudinally between a lower portion operatively coupled to said seat cushion and an upper portion for supporting the seat occupant in an upright position;
- said seat back including an outer peripheral frame member, an inner occupant support frame operatively connected and supported by said outer peripheral frame member and movable from an occupant support position to an impact displacement position extending rearwardly of said outer peripheral frame member, said outer peripheral frame member includes an inboard side support bar spaced from an outboard side support bar and interconnected at one end by a upper support bar to define a generally U-shaped outer peripheral frame member, a displacable connection member operatively connecting said inner occupant support frame and said outer peripheral frame for maintaining said inner occupant support frame in said occupant support position during normal seat occupant use and for providing movement of said inner occupant support frame to said impact displacement position in response to a predetermined impact load exerted on said seat assembly, said displacable connection member includes a lateral torsion spring element having a torsion support bar having opposite ends and extending laterally between said opposing spaced apart side support bars and a torsion bar extending from each end of said torsion support bar to said respective adjacent side support bar and a spring coil interconnecting each of said torsion bars to said respective side support bar for providing resilient displacement of said inner occupant support frame between said occupant support position and said impact displacement position, and wherein said inner occupant support frame includes a pair of generally parallel spaced apart and longitudinally extending wire rods positioned between said inboard and outboard side support bars and extending between a first end coupled to said lateral torsion support bar and a second end operatively coupled to said upper support bar of said outer peripheral frame.

14. A seat assembly as set forth in claim 13 wherein said displaceable connection member includes a cylindrical fracturable body member coupled between each of said first ends of said wire rods and said lateral torsion support bar.

15. A seat assembly as set forth in claim 14 wherein said body member includes first and second elongated channels extending between opposing ends of said body member for slidably receiving said first end of said wire rod and said torsion support bar respectively.

16. A seat assembly as set forth in claim 15 wherein said body member includes a first shelf closing a portion of said first channel from supporting said wire rod thereon adjacent one end of said body member and a second shelf closing a portion of said second channel for supporting said torsion support bar thereon adjacent the opposite end of said body member defining a displacement space therebetween.

17. A seat assembly as set forth in claim 16 wherein said first and second shelves are fracturable in response to a predetermined load force to allow ends of said wire rods and said torsion support bar to slide along said respective first and second channels through said displacement space for engagement and displacement of said inner occupant support frame from said occupant support position to said impact displacement position.

* * * * *